United States Patent
Narasimhan et al.

(10) Patent No.: US 10,057,582 B2
(45) Date of Patent: Aug. 21, 2018

(54) INDIVIDUAL BUFFER MANAGEMENT IN TRANSPORT OF SCALABLE VIDEO

(71) Applicant: ARRIS Enterprises, Inc., Suwanee, GA (US)

(72) Inventors: Mandayam Narasimhan, San Diego, CA (US); Ajay K. Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 171 days.

(21) Appl. No.: 14/718,188

(22) Filed: May 21, 2015

(65) Prior Publication Data

US 2015/0341644 A1 Nov. 26, 2015

Related U.S. Application Data

(60) Provisional application No. 62/001,412, filed on May 21, 2014.

(51) Int. Cl.
*H04N 19/152* (2014.01)
*H04N 19/184* (2014.01)
(Continued)

(52) U.S. Cl.
CPC ......... *H04N 19/152* (2014.11); *H04N 19/184* (2014.11); *H04N 19/187* (2014.11);
(Continued)

(58) Field of Classification Search
CPC .. H04N 19/152; H04N 19/184; H04N 19/187; H04N 19/30; H04N 19/70;
(Continued)

(56) References Cited

U.S. PATENT DOCUMENTS 5,818,531 A * 10/1998 Yamaguchi ............... G06T 3/40
375/240.2
8,705,624 B2 4/2014 Gupta
(Continued)

FOREIGN PATENT DOCUMENTS

WO 2008/084184 7/2008
WO 2008085433 A2 7/2008
(Continued)

OTHER PUBLICATIONS

PCT Search Report & Written Opinion, Re: Application No. PCT/US2015/318971; dated Jul. 17, 2015.
(Continued)

*Primary Examiner* — Deirdre Beasley
(74) *Attorney, Agent, or Firm* — Lori Anne D. Swanson

(57) ABSTRACT

A method is provided to determine buffer parameter settings for a plurality of layers in a transport stream. Each layer includes a respective transport stream buffer parameter setting. Then, the method provides respective transport stream buffer parameter settings to individual transport stream buffers for respective layers in the plurality of layers. Then, the method buffers the respective layers in the individual transport stream buffers according to the respective transport stream buffer parameter settings. After buffering, the method combines the respective layers to form a combined bit stream.

20 Claims, 8 Drawing Sheets

(51) Int. Cl.
*H04N 19/187* (2014.01)
*H04N 21/2343* (2011.01)
*H04N 21/434* (2011.01)
*H04N 21/44* (2011.01)
*H04N 19/30* (2014.01)
*H04N 19/70* (2014.01)

(52) U.S. Cl.
CPC ..... *H04N 19/30* (2014.11); *H04N 21/234327* (2013.01); *H04N 21/4347* (2013.01); *H04N 21/44004* (2013.01); *H04N 19/70* (2014.11)

(58) Field of Classification Search
CPC ....... H04N 21/234327; H04N 21/4347; H04N 21/44004
USPC .......................................................... 375/0.02
See application file for complete search history.

(56) References Cited

U.S. PATENT DOCUMENTS

| | | | |
|---|---|---|---|
| 9,325,997 B2 | 4/2016 | Deshpande | |
| 9,326,005 B2 | 4/2016 | Terada | |
| 2005/0254575 A1 | 11/2005 | Hannuksela et al. | |
| 2007/0091919 A1* | 4/2007 | Sandoval | H04N 21/235 370/466 |
| 2007/0160126 A1 | 7/2007 | Van Der Meer | |
| 2007/0230564 A1 | 10/2007 | Chen | |
| 2007/0291837 A1 | 12/2007 | Eleftheriadis | |
| 2008/0159384 A1* | 7/2008 | Civanlar | H04L 12/66 375/240.01 |
| 2009/0225870 A1* | 9/2009 | Narasimhan | H04N 7/52 375/240.26 |
| 2011/0002397 A1* | 1/2011 | Wang | H04N 19/70 375/240.26 |
| 2011/0012994 A1* | 1/2011 | Park | H04N 21/234327 348/43 |
| 2011/0032999 A1* | 2/2011 | Chen | H04N 21/234327 375/240.26 |
| 2011/0110436 A1 | 5/2011 | Schierl | |
| 2011/0274180 A1* | 11/2011 | Lee | H04N 19/30 375/240.25 |
| 2012/0230401 A1 | 9/2012 | Chen | |
| 2012/0230431 A1 | 9/2012 | Boyce et al. | |
| 2012/0230432 A1 | 9/2012 | Boyce et al. | |
| 2013/0010863 A1 | 1/2013 | Wu | |
| 2013/0114680 A1 | 5/2013 | Leontaris | |
| 2013/0128990 A1* | 5/2013 | Narasimhan | H04N 7/52 375/240.25 |
| 2013/0266077 A1 | 10/2013 | Boyce | |
| 2014/0010291 A1 | 1/2014 | He | |
| 2014/0023138 A1* | 1/2014 | Chen | H04N 19/597 375/240.12 |
| 2014/0093179 A1* | 4/2014 | Deshpande | H04N 19/70 382/233 |
| 2014/0115100 A1 | 4/2014 | Changuel | |
| 2014/0181885 A1 | 6/2014 | Rusert | |
| 2014/0301476 A1 | 10/2014 | Deshpande | |
| 2014/0301482 A1 | 10/2014 | Narasimhan | |
| 2015/0016547 A1 | 1/2015 | Tabatabai et al. | |
| 2015/0195532 A1 | 7/2015 | Nakagami | |
| 2015/0229966 A1 | 8/2015 | Choe | |
| 2015/0256838 A1* | 9/2015 | Deshpande | H04N 19/70 375/240.02 |
| 2015/0341644 A1 | 11/2015 | Narasimhan | |
| 2015/0341649 A1 | 11/2015 | Narasimhan | |
| 2016/0044324 A1* | 2/2016 | Deshpande | H04N 19/70 375/240.25 |
| 2016/0156914 A1* | 6/2016 | Suehring | H04N 19/70 375/240.12 |

FOREIGN PATENT DOCUMENTS

| | | |
|---|---|---|
| WO | 2014/168890 A1 | 10/2014 |
| WO | 2014/168893 A1 | 10/2014 |

OTHER PUBLICATIONS

S. Narasimhan, et al., "Consideration of buffer management issues and layer management in HEVC scalability", 14th JCT-VC Meeting (Joint Collaborative Team on Video Coding of ISO/IEC JTC1/SC29/WG11 and ITU-T SG.16), Jul. 24, 2013.
Anonymous, "Text ISO/IEC 13818-1:2007/FPDAM3.2 Carriage of SVC in MPEG-2 Systems", 83rd MPEG Meeting (Motion Picture Expert Group or ISO/IEC JTC1/SC29/WG11), Feb. 7, 2008.
S. Narasimhan, et al., "Multilayer HRD Management", 15th JCT-VC Meeting Joint Collaborative Team on Video Coding of ISO/IEC JTC1/SC29/WG11 and ITU-T SG.16), Oct. 24, 2013.
PCT International Search Report & Written Opinion, Re: Application No. PCT/US2015/031903, dated Jul. 21, 2015.
"Text of ISO/IEC 13818-1:2013 PDAM 7 Carriage of Layered HEVC", 108th MEPG Meeting (Motion Picture Expert Group or ISO/IEC JTC1/SC29/WG11), May 8, 2014.
"Text of ISO/IEC 13818-1:2013/FDAM 3 Carriage of HEVC", 105th MEPG Meeting (Motion Picture Expert Group or ISO/IEC JTC1/SC29/WG11), Sep. 6, 2013.
PCT Search Report & Written Opinion, Re: Application #PCT/US2014/033231; dated Jul. 4, 2014.
Y-K Wang, et al., "SVC hypothetical reference decoder (HRD)", 21st JVT Meeting, 78th MPEG Meeting; Oct. 20, 2006.
P A Chou, et al., "A generalized hypothetical reference decoder for H.264/AVC", IEEE Transactions on Circuits and Systems for Video Technology, vol. 13, No. 7, Jul. 1, 2013.
PCT Search Report & Written Opinion, Re: Application #PCT/US2014/033236; dated Jul. 2, 2014.
S. Narasimhan, et al., "Signaling Framework to Support HEVC Scalability", 101st MPEG Meeting (Motion Picutre Expert Group or ISO/IEC/JTC1/SC29/WG11), Jul. 11, 2012, 2 pgs.
Anonymous, "Requirements of the Scalable Enhancement of HEVC", 101st MPEG Meeting (Motion Picture Expert Group or ISO/IEC/JTC1/SC29/WG11), Aug. 3, 2012, 12 pgs.
J. Chen, et al., "SHVC Working Draft 1", 12th JCT-VC Meeting (Joint Collaborative Team on Video Coding of ISO/IEC/JTC1/SC29/WG11 and ITU-T SG.16), Mar. 20, 2013, 34 pgs.
J. Boyce, et al., "VPS Support for Out-of-Band Signaling and Hybrid Codec Scalability", 11th JCT-VC Meeting (Joint Collaborative Team on Video Coding of ISO/IEC/JTC1/SC29/WG11 and ITU-T SG.16), Oct. 1, 2012, 6 pgs.
J. Boyce, et al., "VPS Support for Out-of-Band Signaling and Hybried Codec Scalability," Vidyo Personal Telepresence, JCTVC-K0206, Oct. 10-19, 2012.
J. Chen, et al., "SHVC Draft Text 1", Document of Joint Collaborative TEam on Video Coding, JCTVC-L1008, Jan. 14-23, 2013.

* cited by examiner

INDIVIDUAL BUFFER MANAGEMENT IN TRANSPORT OF SCALABLE VIDEO

CROSS-REFERENCES TO RELATED APPLICATIONS

The present disclosure claims priority to U.S. Provisional App. No. 62/001,412, entitled "Transport of SHVC and support for compelling use cases", filed May 21, 2014, the contents of which is incorporated herein by reference in its entirety. The present disclosure is related to PCT App. No. PCT/US2014/033231, entitled "Individual Buffer Management in Video Coding", filed Apr. 7, 2014, the contents of which is incorporated herein by reference in its entirety. The present disclosure is also related to U.S. patent application Ser. No. 14/718,203, entitled "Signaling for Addition or Removal of Layers in Scalable Video," filed concurrently, and incorporated by reference in its entirety. The present disclosure is also related to U.S. patent application Ser. No. 14/718,216, entitled "Signaling for Addition or Removal of Layers in Scalable Video," filed concurrently, and incorporated by reference in its entirety.

BACKGROUND

Scalable video coding supports decoders with different capabilities. An encoder generates multiple encoded bitstreams for an input video. This is in contrast to single layer coding, which only uses one encoded bitstream for a video. In the scalable video coding, one of the output encoded bitstreams, referred to as the base layer (BL), can be decoded by itself and this encoded bitstream provides the lowest scalability level of the video output. To achieve a higher level of video output, the decoder can process the base layer bitstream together with other encoded bitstreams, referred to as enhancement layers (EL). The enhancement layer may be added to the base layer to generate higher scalability levels. One example is spatial scalability, where the base layer represents the lowest resolution video and the decoder can generate higher resolution video using the base layer bitstream together with additional enhancement layer bitstreams. Thus, using additional enhancement layer bitstreams produce a better quality video output, such as by achieving temporal, signal-to-noise ratio (SNR), and spatial improvements.

In a transmission model, such as a simulcast, a video on demand, or a streaming model, the encoder may transmit the video stream over various mediums to various decoders of different capabilities. Buffer management requires sending the compressed bytes of video data for each picture (also called access unit) into a video buffer whose size and input rate is defined by a video standard and a scheme where the picture data is removed at a specified time from the video buffer. Standards require that the video buffer never overflow (that is the video picture data is removed at correct time before new data enters the buffer thus making it overflow).

Decoders buffer the combined encoded bitstream before decoding unless only the base layer is being used. If only the base layer is being decoded, the decoder would buffer just the base layer. The buffer management may become difficult among decoders that are combining a different number of layers of the scalable video. For example, some of the decoders may request just the base layer, and some decoders may request the base layer and any number of enhancement layers. Decoders that request more than the base layer would combine the base layer and any enhancement layers, and then subsequently decode the combined bitstream. Because the buffers include different layers combined into encoded bitstreams, such as some buffers may include just the base layer, and other buffers may include a different number of layers (e.g., a base layer plus any number of enhancement layers), the management of the buffers may be difficult. For example, removal of the base layer plus enhancement layer data after combining them adds complexity and is a burden to the buffer management systems and many transport processing systems that are used for base layer processing need to be re-designed and modified. This also imposes a burden on other applications such as re-multiplexing and transcoding.

Furthermore, while the above relates to video encoding, similar problems exist for creating and managing MPEG-2 transport streams, which may include multiple streams including scalable video streams. MPEG-2 is the designation for a group of such standards, promulgated by the Moving Picture Experts Group ("MPEG") as the ISO/IEC 13818 international standard. A typical use of MPEG-2 is to encode audio and video for broadcast signals, including signals transmitted by satellite and cable. Thus, MPEG-2 transport streams may be prone to buffering issues due to the multiple layers in a scalable video stream.

SUMMARY

In one embodiment, a method according to the present invention includes: determining buffer parameter settings for a plurality of layers in a transport stream, wherein each layer includes a respective transport stream buffer parameter setting; providing respective transport stream buffer parameter settings to individual transport stream buffers for respective layers in the plurality of layers; buffering the respective layers in the individual transport stream buffers according to the respective transport stream buffer parameter settings; and after buffering, combining the respective layers to form a combined bitstream; wherein the transport stream is at least partially derived from a respective video stream having a plurality of layers, each video stream layer including a respective video stream buffer parameter setting.

In another embodiment, an apparatus includes: one or more computer processors; and a computer readable storage medium comprising instructions that, when executed, cause the one or more processors to: determine buffer parameter settings for a plurality of layers in a transport stream, wherein each layer includes a respective transport stream buffer parameter setting; send respective transport stream buffer parameter settings to individual transport stream buffers for respective layers in the plurality of layers to a decoder; wherein the decoder buffers the respective buffer parameter settings, and wherein the respective layers are combined after the buffers to form a combined bitstream, and wherein the transport stream is at least partially derived from a respective video stream having a plurality of layers, each video stream layer including a respective video stream buffer parameter setting.

In one embodiment, an apparatus includes: one or more computer processors; and a computer readable storage medium comprising instructions that, when executed, cause the one or more processors to: determine buffer parameter settings for a plurality of layers in a transport stream, wherein each layer includes a respective transport stream buffer parameter setting; apply respective transport stream buffer parameter setting to individual buffers for respective layers in the plurality of layers; and buffer the respective layers in the individual transport stream buffers according to the respective transport stream buffer parameter settings, wherein the respective layers are combined after the buffers to form a combined bitstream, and wherein the transport stream is at least partially derived from a respective video stream having a plurality of layers, each video stream layer including a respective video stream buffer parameter setting.

The following detailed description and accompanying drawings provide a better understanding of the nature and advantages of particular embodiments.

DETAILED DESCRIPTION

Described herein are techniques for a buffer management system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide individual buffer management for layers in a scalable video coding scheme, such as high efficiency scalable video coding for high efficiency video coding (HEVC). HEVC scalability may support adding scalability to pre-compressed base layers and/or other enhancement layers. In all these cases, it may be difficult to manage base layer and [base+enhancement layer] buffers in parallel to achieve conformant buffer behaviour. Accordingly, in one embodiment, buffer parameter settings manage buffer parameters, such as the buffer size and bitrate of individual buffers that store individual layers. That is, each layer may be stored in an individual buffer that can be managed with a respective buffer parameter setting. For example, a base layer is stored in a first buffer and an enhancement layer is stored in a second buffer, and other enhancement layers are stored in other respective buffers. Each buffer may be managed with a buffer parameter setting that specifies parameters, such as the bitrate and size for each respective buffer. Managing the individual buffers simplifies the management of the buffers and also provides flexibility in allowing addition of additional enhancement layers or the changing of parameters for a layer.

Figure 1:
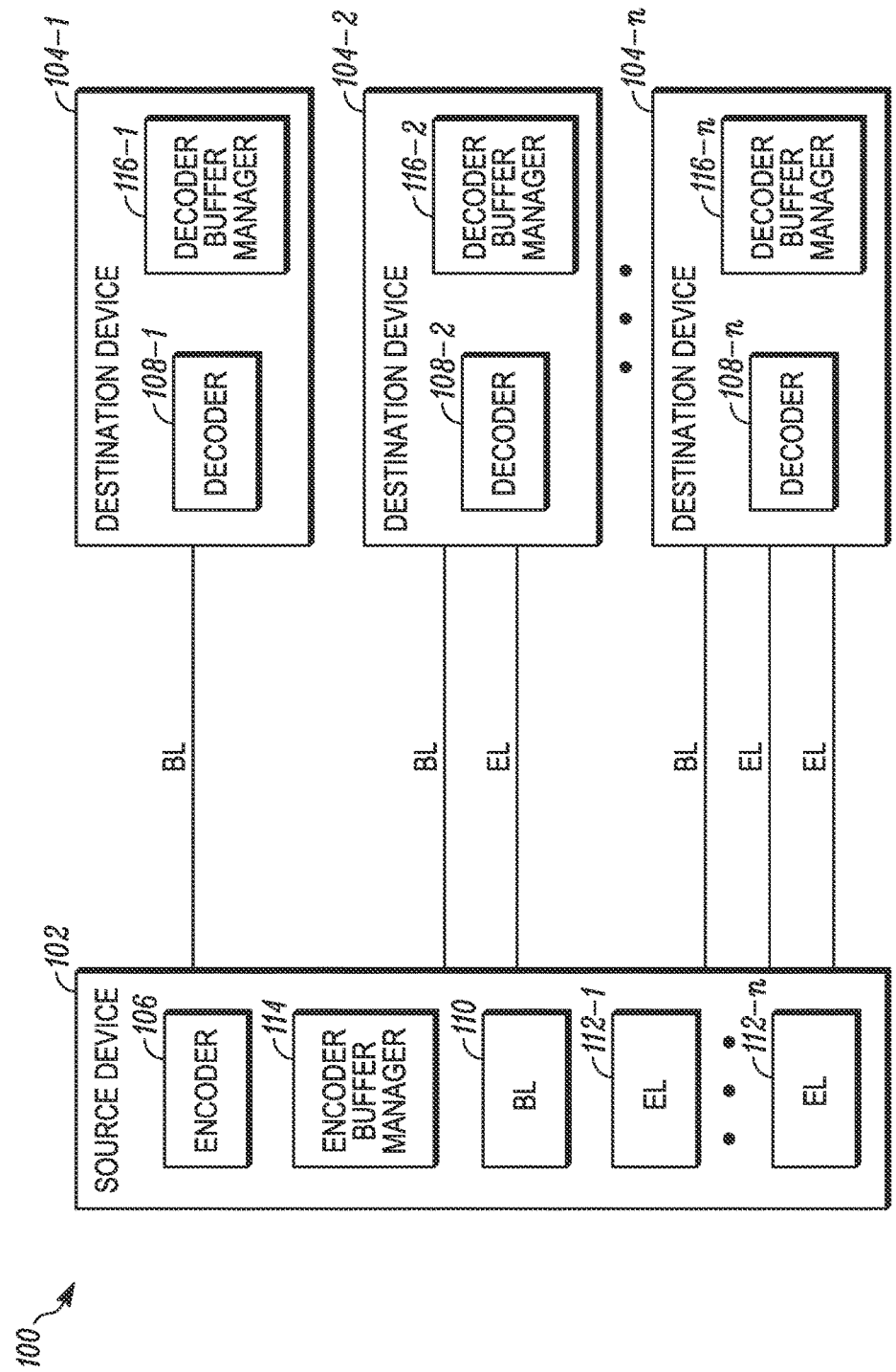
FIG. 1 depicts a simplified system for providing scalable video according to one embodiment.

FIG. 1 depicts a simplified system 100 for providing scalable video according to one embodiment. System 100 includes a source device 102 and a plurality of destination devices 104-1-104-N. Source device 102 includes an encoder 106 and each destination device 104-1-104-N includes a respective decoder 108-1-108-N. Source device 102 may be a device that transmits encoded video to destination devices 104. In one embodiment, source device 102 may include a server or any other networking device or system that can encode video and transmit encoded video. Destination devices 104 may include devices that are capable of decoding the encoded video. Destination devices 104 may include networking devices, set top boxes, cellular phones, televisions, and any other computing devices.

In one embodiment, in scalable video coding, encoder 106 may generate multiple bitstreams for an input video. As mentioned above, the base layer may be decoded by itself and provides the lowest scalability level of the video output, and additional enhancement layers may be combined with the base layer to generate higher scalability levels. The enhancement layers enhance other layers, such as zero or more enhancement layers and the base layer. As shown, encoder 106 may generate a base layer (BL) 110 and any number of enhancement layers (EL) 112-1-112-N.

Destination devices 104 may request different layers from source device 102 depending on the destination device's capabilities. Source device 102 always needs to send base layer 110 to destination devices 104. However, source device 102 may send any number of enhancement layers 112 to destination devices 104 including no enhancement layers 112. As shown in FIG. 1, destination device 104-1 only receives base layer 110. In this case, destination device 104-1 may only have the capability of generating the lowest resolution video. Destination device 104-2 receives the base layer 110 and one enhancement layer 112-1. Decoder 108-2 can combine the base layer 110 and enhancement layer 112-1 to generate a higher resolution video. Also, destination device 104-N receives base layer 110 and enhancement layers 112-1-112-N. Decoder 108-N combines base layer 110 and the received enhancement layers 112-1-112-N. The above process may save bandwidth. For example, decoder 108-1 may only be able to decode the base layer and thus not receiving the enhancement layers may reduce the bandwidth required to send the video stream to destination device 104-1. The same is true for destination device 104-2 as less enhancement layers are sent to destination device 104-2 than to device 104-N.

Encoder 106 and decoders 108 manage the buffers (not shown) in decoders 108 that store the bitstreams received for base layer 110 and enhancement layers 112. For example, encoder 106 includes an encoder buffer manager 114 and each decoder 108 includes respective decoder buffer managers 116-1-116-N. In one embodiment, encoder buffer manager 114 may signal buffer parameter settings to decoders 108. In other embodiments, encoder buffer manager 114 may not send the buffer parameter settings to decoder buffer manager 116; rather, as will be discussed in more detail below, the buffer parameter settings may be preset in decoder buffer manager 116. Decoder buffer managers 116 may then manage the individual buffers that store base layer 110 and enhancement layers 112 using the buffer parameter settings.

The buffer parameter settings may manage characteristics of the buffer, such as the bitrate and the buffer size allocated for each layer. For example, the maximum bitrate and the maximum buffer size are managed. Although "settings" are described, the settings may include a setting for one single parameter or multiple parameters.

Figure 2A:
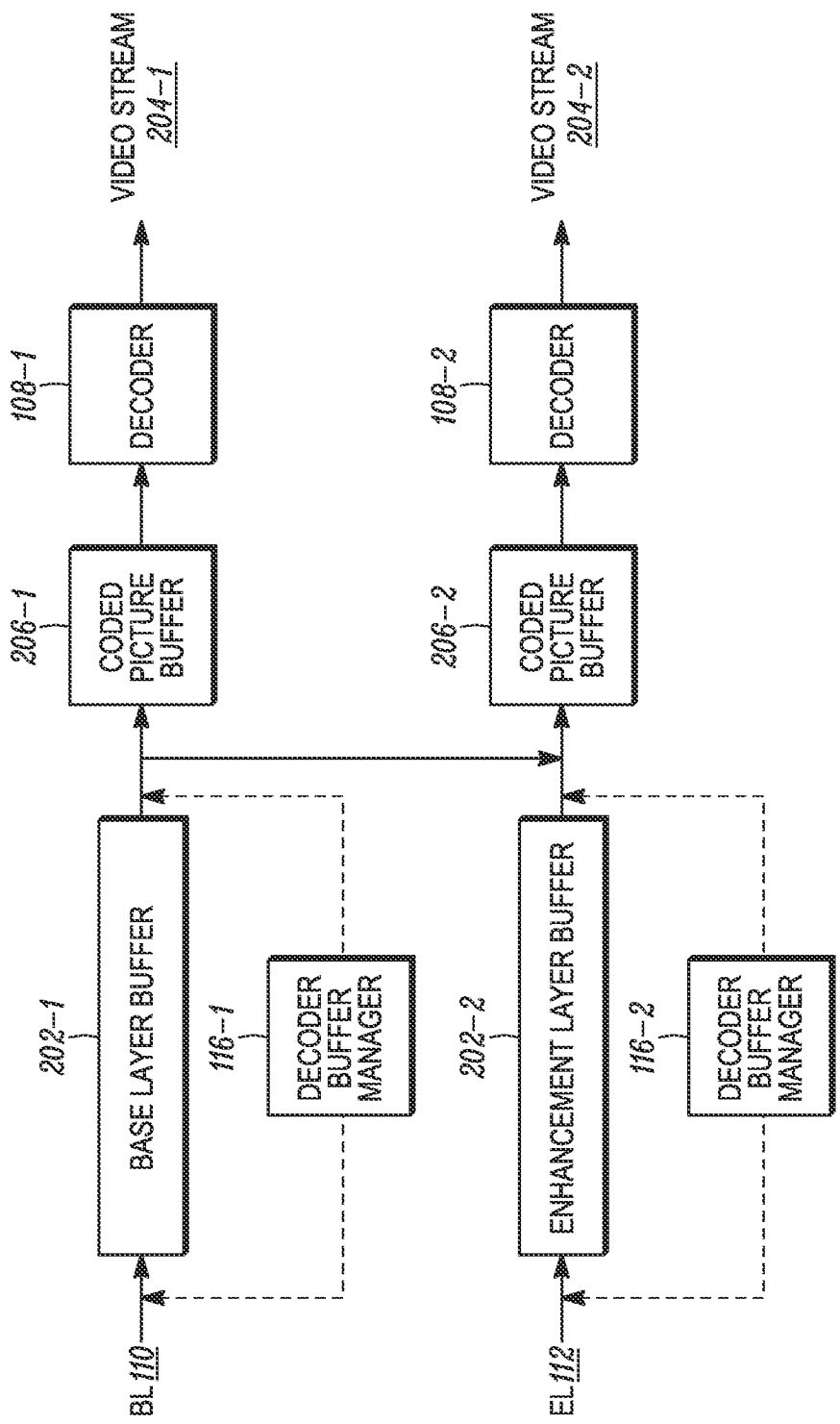
FIG. 2A depicts a simplified example of individual buffers for a base layer and enhancement layers according to one embodiment.

As described above, particular embodiments manage the individual buffers for each layer (base layer 110 and enhancement layers 112) before the combining of the bitstreams for the base layer 110 and enhancement layers 112. FIG. 2A depicts a simplified example of individual buffers 202 for base layer 110 and enhancement layers 112 according to one embodiment. A base layer buffer 202-1 and an enhancement layer buffer 202-2 buffer the base layer and the enhancement layer, respectively. A coded picture buffer 206-1 buffers the encoded bitstream of the base layer. A base layer decoder 108-1 only decodes the base layer. If enhancement layers are to be decoded, a coded picture buffer 206-2 buffers a combination of the base layer and the enhancement layers. An enhancement layer decoder 108-2 decodes the output of coded picture buffer 206-2, i.e., the combined base layer and enhancement layers. A first video stream at 204-1 is output by a first decoder 102-1 and a second video stream at 204-2 is output by a second decoder 102-2. First decoder 108-1 and second decoder 108-2 may be in different destination devices 104, or could be in the same destination device 104.

Decoder buffer managers 116 manage buffers 202 at various points. For example, decoder buffer managers 116 manage the input to buffers 202 and the output of buffers 202. This may simplify the buffer management by defining buffer parameter settings for a buffer for each enhancement layer independently and thus moving the buffer management before re-assembly of base and enhancement layers. This makes the buffer management similar for all the layers including base layer. In contrast to the Background, decoder buffer managers 116 manage the input to enhancement layer buffer 202-2 and also the output of enhancement layer buffer 202-2. This is in contrast to managing just the output of coded picture buffer 206-2, which outputs the combination of the base layer and the enhancement layers.

In one embodiment, buffer management in the video layer is called HRD (Hypothetical reference decoder). The video layer may also be transported in a transport stream. The corresponding buffer management in the transport stream (MPEG transport stream) is called T-STD (Transport-System Target Decoder). For a majority of the applications that use video such as broadcast, streaming, or VOD, the video is usually encapsulated in the transport stream and transmitted. Buffer management requires sending the compressed bytes of video data (e.g., the encoded bitstream) for each picture (also called access unit). The video data is stored in buffers 202 whose size and input rate is defined by the buffer parameter settings, such as a scheme where the picture data is removed at a specified time from buffers 202. Managing individual buffers 202 simplifies the complexity of the system target decoder's buffer management and makes it easier to implement. Also, managing the buffers for the individual base layer and enhancement layers independently before reassembly of the layers simplifies the hypothetical reference decoder model.

Figure 2B:
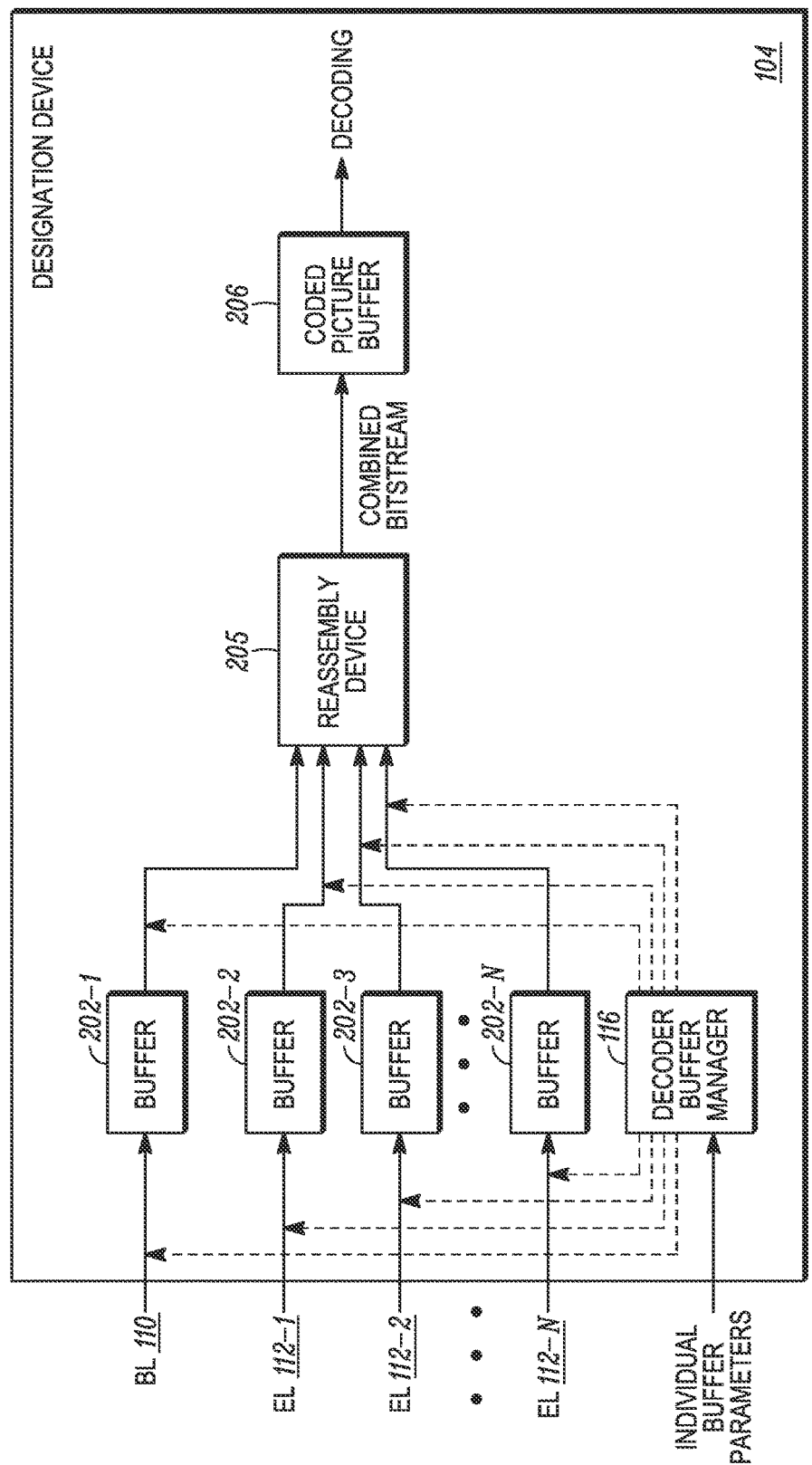
FIG. 2B depicts a more detailed example of a destination device according to one embodiment.

FIG. 2B depicts a more detailed example of destination device 104 according to one embodiment. Buffers 202-1-202-N are included in a single destination device 104. Buffer 202-1 receives base layer 110 from encoder 106, and buffers 202-2-202-N receive respective enhancement layers 112-1, 112-2, . . . , 112-N, respectively. As will be discussed in more detail below, destination device 104 may receive a transport stream that includes packets for encoded bitstreams of the base layer and enhancement layers. Destination device 104 demultiplexes the transport stream and stores respective bitstreams for base layer 110 and enhancement layers 112 from the transport stream in the proper buffers 202.

The bitstreams may be then multiplexed together to form a combined bitstream. For example, a reassembly device 205 receives the encoded bitstreams for base layer 110 and enhancement layers 112 from buffers 202, and then combines base layer 110 with enhancement layers 112 to form a combined bitstream. Reassembly device 205 stores the combined bitstream in a coded picture buffer 206. Decoder 108 reads the coded pictures out of coded picture buffer 206 for decoding.

Decoder buffer manager 116 receives buffer parameter settings for each layer. For example, decoder buffer manager 116 receives a first buffer parameter setting for base layer 110, a second buffer parameter setting for enhancement layer 112-1, a third buffer parameter setting for enhancement layer 112-2, and so on. Although buffer parameter settings for each layer are described, it will be understood that some buffer parameter settings may apply to multiple layers, or a single buffer parameter setting may apply to all layers.

Decoder buffer manager 116 may apply buffer parameter settings to the input and output of individual buffers 202 that are buffering each individual layer. In this case, decoder buffer manager 116 applies buffer parameter setting #1 to buffer 202-1, buffer parameter setting #2 to buffer 202-2, buffer parameter setting #3 to buffer 202-3, and buffer parameter setting #N to buffer 202-N. This manages the buffers for each individual layer independently. That is, the buffers are managed for each individual layer before any combination of the layers occurs.

Managing individual buffers 202 also makes management of the coded picture buffer 206, which stored the combined bitstream, not necessary. Managing the bitrate and buffer size for each of the layers in buffers 202 may indirectly manage the coded picture buffer 206. That is, if the bitstream read out of buffers 202 is controlled, the combined bitstream for coded picture buffer 206 is indirectly controlled.

Figure 3:
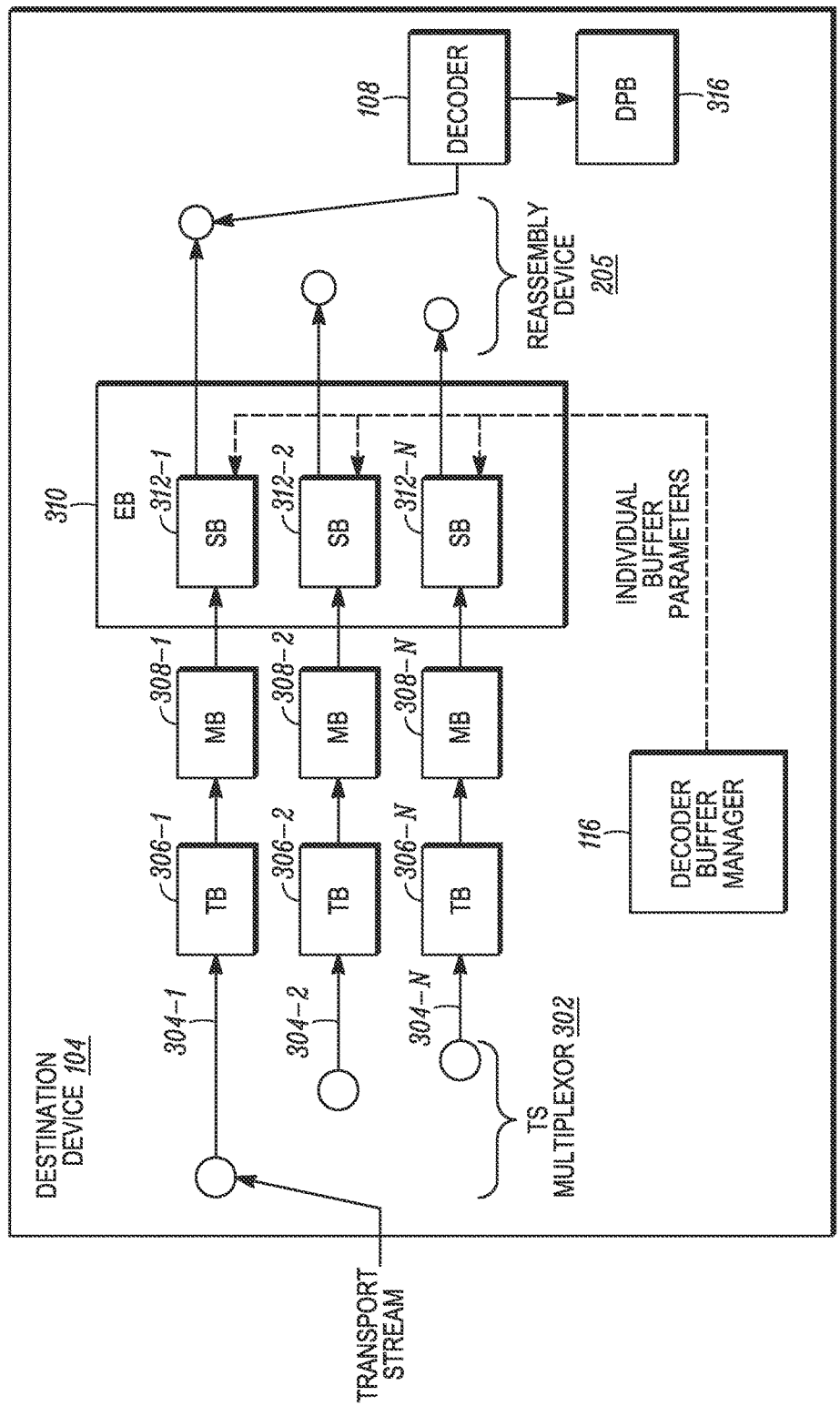
FIG. 3 depicts a more detailed example of the buffers for the destination device according to one embodiment.

In the T-STD, there may be other buffers where the transport stream (e.g., the encapsulated video data) is buffered. FIG. 3 depicts a more detailed example of the buffers for destination device 104 according to one embodiment. Destination device 104 may use various types of buffers to buffer the transport stream, with each buffer serving a different function. The output of the buffers may be the encoded bitstream for a layer that is extracted from the transport stream. However, it will be understood that although these buffers are shown, the buffers may be configured differently.

An encoded bitstream is received at a transport stream (TS) demultiplexer 302. The transport stream may include packets that include the encoded bitstream for all layers where packets for different layers are intermixed. Each packet may include information for a single layer, however, and are identified via a packet identifier (PID) for the respective layer. TS demultiplexer 302 uses the packet identifier to demultiplex the transport stream. That is, TS demultiplexer 302 forwards transport stream packets to various buffers that handle respective layers. In one example, TS demultiplexer 302 sends the packets for base layer 110 in a stream shown at 304-1 and TS demultiplexer 302 sends packets for enhancements layers 112 in streams shown at 304-2-304-N, respectively.

Transport stream buffers (TB) 306-1-306-N store the transport packets for each respective layer. Then, the data is transferred to respective multiplexing buffers (MB) 308-1-308-N with the headers removed from the transport packets. In each multiplexing buffer, additional processing of the data may be performed, such as removing the packetized elementary stream (PES) packet header data. The resulting data is transferred to an elementary stream buffer (EB) 310, which includes respective stream buffers (SB) 312-1-312-N. SB 312-1-312-N may correspond to buffers 202 as described previously. In each SB 312, the encoded streams for each layer are reconstructed and output to reassembly device 205, which may be a multiplexer. Reassembly device 205 then reassembles base layer 110 and any enhancement layers 112 and outputs the combined bitstream to decoder 108 that performs the decoding process. Once the encoded combined bitstream is decoded, decoded pictures are stored in a decoded picture buffer (DPB) 316.

As mentioned above, decoder buffer manager 116 may manage individual buffers independently. In this case, decoder buffer manager 116 may manage the input and the output of SB 312-1-312-N using buffer parameter settings; however, TB buffers 306 or MB buffers 308 may also be managed individually.

In some embodiments, the plurality of buffers TB 306, MB 308 and EB 310, or a sub-combination of them, may be referred to collectively as "transport stream buffers" or "transport stream buffer system" since they are managing the buffering of the transport streams. The decoder buffer managers 116 manage the input to the transport stream buffers and also the output of the transport stream buffers. This is in contrast to managing just the output of the transport stream buffers, which outputs the combination of the scalable video streams. Thus, the transport stream buffer management is achieved at the layer-level, where each buffer is managed before re-assembly.

Thus, in some embodiments, the decoder buffer managers 116 manage the individual transport stream buffers by receiving instructions (e.g., buffer parameter settings) from encoder buffer managers 114. The buffer parameter settings may manage characteristics of the buffer, such as the bitrate and the buffer size allocated for each layer. For example, the maximum bitrate and the maximum buffer size are managed. Although "settings" are described, the settings may include a setting for one single parameter or multiple parameters.

As discussed above, particular embodiments may provide the buffer parameter settings to decoder buffer manager 116 in different ways. In one embodiment, encoder buffer manager 114 may signal the buffer parameter settings in the video stream or the transport stream. In some embodiments, the buffer parameter settings for each transport stream layer are acquired from the respective buffer parameter settings in the video stream layers. For example, the buffer parameter settings (for buffer management) may be acquired from the video parameter set (VPS), video usability information (VUI), sequence parameter set (SPS), supplemental enhancement information (SEI). In another embodiment, the buffer parameter settings may be predetermined and preset in decoder buffer manager 116. The following will describe the two different ways.

Figure 4:
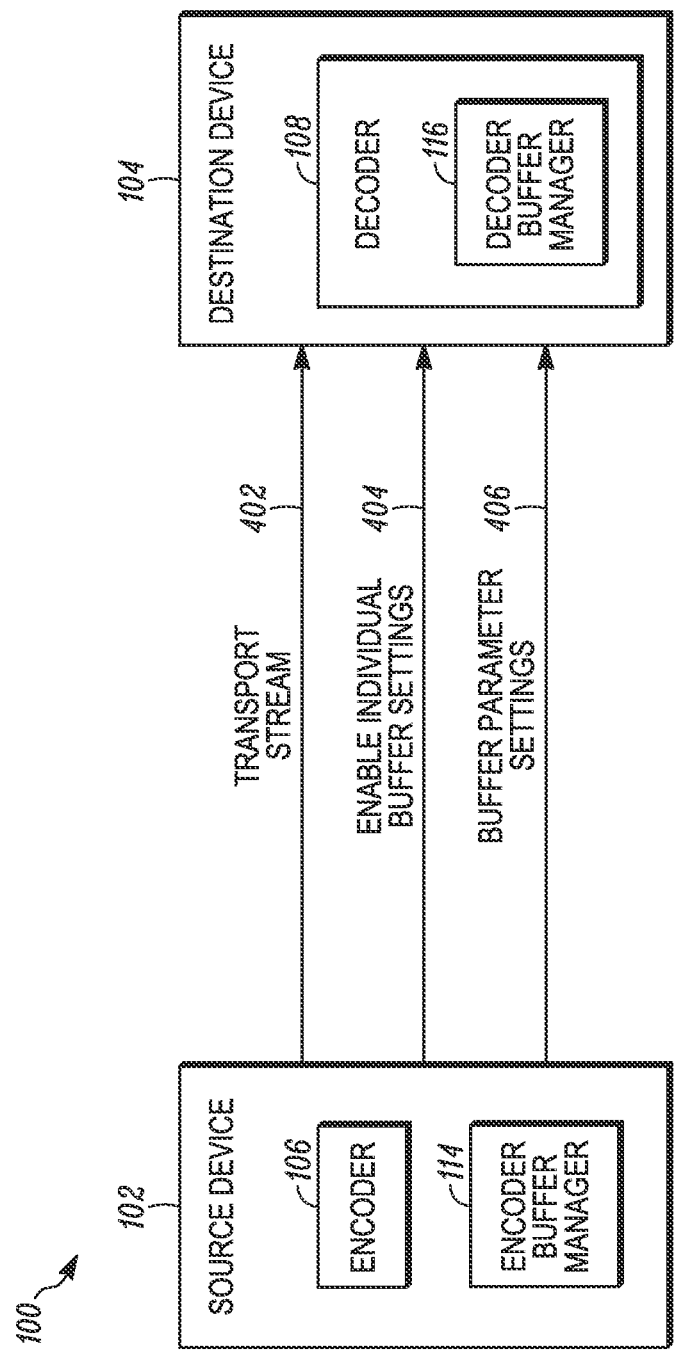
FIG. 4 depicts an example of signaling the buffer parameter settings according to one embodiment.

FIG. 4 depicts an example of signaling the buffer parameter settings according to one embodiment. First, the signaling in the video stream may indicate that the encoded bitstream can be managed for each layer (where the bitrate and buffer size is signaled for each layer separately). In one embodiment, the signaling is done using two methods—the first is in the video layer and may use the VPS, SPS, VUI or a new SEI that first signals the ability to do individual layer buffer management and also provides the buffer parameters such as input video rate to decoder buffer managers 116 and the layer-specific buffer size. The second method is in the video layer and may use HRD parameters in the video VUI (video usability information) that signals the same information as in the SEI. In the transport stream, the corresponding signaling is a specific 'video descriptor' in the program map table (PMT) for each video layer that maps the parameters from the video to this descriptor.

Table I includes a new prefix SEI payload type value in HEVC to signal layer specific information such as maximum bit rate, average bit rate and maximum CPB buffer size. Table I provides an example of the SEI message syntax where the parameters can be signaled for a single layer or multiple layers. Although HEVC is discussed, the syntax may be applied to other video coding standards.

HEVC Scalability Information SEI Message Syntax

TABLE I

| HEVC_scalability_info( payloadSize ) { | C | Descriptor |
|---|---|---|
| active_vps_id | 5 | u(4) |
| for( i = 1; i <= vps_max_layer_id; i++ ) { | | |
| layer_level_info_present_flag[ i ] | 5 | u(1) |
| layer_hrd_info_present_flag[i] | 5 | u(1) |
| If (layer_level_info_present_flag[i] | | |
| layer_level_idc[i] | 5 | u(8) |
| if( layer_hrd_info_present_flag[i] ) { | | |
| layer_avg_bitrate_value[ i ] | 5 | u(16) |
| layer_max_bitrate_value[ i ] | 5 | u(16) |
| layer_avg_cpb_size_value[i] | 5 | u(16) |
| layer_max_cpb_size_value[i] | 5 | u(16) |
| layer_max_bitrate_calc_window[ i ] | 5 | u(16) |
| } | | |
| } | | |

The following describe the syntax in more detail:

active_vps_id: identifies an active video parameter set (VPS) that contains the layer information. The value of active_vps_id shall be equal to the value of video_parameter_set_id of the active VPS for the video coding layer (VCL) network abstraction layer (NAL) units of the access unit containing the SEI message.

layer_level_info_present_flag[i]: specifies whether the level information about layer index i.

layer_level_idc[i]: indicates a level to which ith layer in the CVS conforms as specified in Annex A of the HEVC specification.

layer_hrd_info_present_flag[i]: specifies whether the hrd information about layer index i is present.

layer_max_bit_rate_value[i]: specifies the maximum bit rate value of layer index i.

layer_avg_bit_rate_value[i]: specifies average bit rate value of layer index i.

layer_max_cpb_size_value[i]: specifies maximum cpb size value of layer index i.

layer_avg_cpb_size_value[i]: specifies average cpb size value of layer index i.

max_bitrate_calc_window[i]: specifies the window to calculate maximum bit rate for layer index i.

In the above syntax, the individual buffer parameters are set, such as the average bitrate and maximum buffer size. This may set the bitrate and size for buffers 202 as described above (or SB 312).

Encoder buffer manager 114 may determine the buffer parameter settings for base layer 110 and enhancement layers 112. Encoder 106 may include these parameters for each of the layers in the video layer. Also, individual packets may include buffer parameter settings 406 in the transport stream 402 to send the buffer parameter settings 406. In this case, the packets that do not include the encoded bitstream include the buffer management settings.

Table II shows a syntax for signaling using HRD extension for each layer:

vps_extension( ) syntax

TABLE II

| vps_extension ( ) { | Descriptor |
|---|---|
| ... | |
|   for( i=0; i <= vps_num_layer_sets_minus1; i++) | |
|   for( j=1; j <= vps_max_layer_id; j++) | |
|   if( layer_id_included_flag[ i ][ j ] ) { | |
|     layer_set_hrd_layer_info_present_flag[ i ][ j ] | u(1) |
|     if( layer_set_hrd_layer_info_present_flag[ i ][ j ]) { | |
|     hrd_parameters(   cprm_present_flag[   i   ], vps_max_sub_layers_minus1 ) | |
|   } | |
| ... | |
| } | |

Decoder 108 receives the transport stream 402, and can determine the buffer parameter settings 406 from the transport stream or video layer when individual buffer parameter settings are enabled 404. Decoder buffer manager 116 then uses the buffer parameter settings to apply the parameters to buffers 202.

Figure 5:
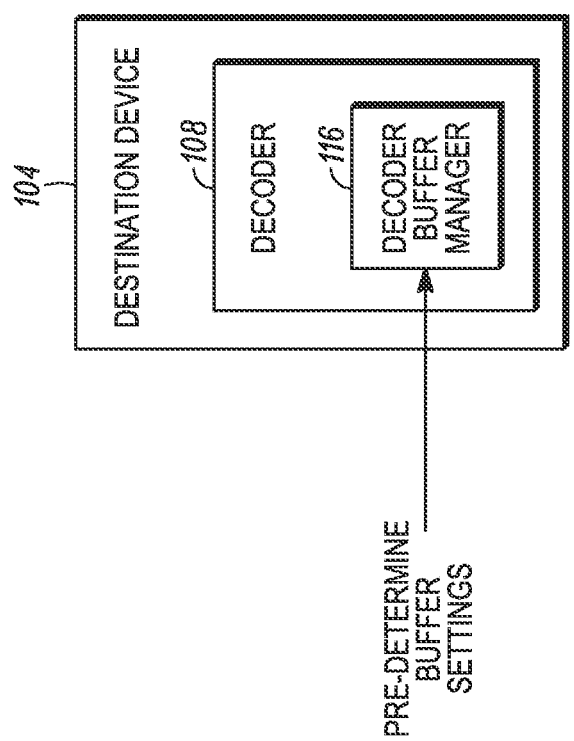
FIG. 5 depicts a second example of configuring buffer parameter settings according to one embodiment.

FIG. 5 depicts a second example of configuring buffer parameter settings according to one embodiment. In this case, decoder buffer manager 116 receives the buffer parameter settings as pre-determined settings. In this case, independent buffer sizes and bitrates may be set for each layer by a specification, such as the HEVC scalability specification. A user or computer may set the buffer parameter settings in decoder buffer manager 116. Then, decoder buffer manager 116 may apply the buffer parameter settings to individual buffers 202. In this case, decoder buffer manager 116 applies the buffer parameter settings implicitly without any communication from encoder 106 that includes the buffer parameter settings.

Alternatively, in some embodiments decoder buffer manager 116 may apply the buffer parameter settings to transport stream buffers. For example, buffer manager may apply buffer parameter settings to individual buffers SB 312. Decoder buffer manager 116 may apply the buffer parameter settings without any communication from encoder 106.

Figure 6:
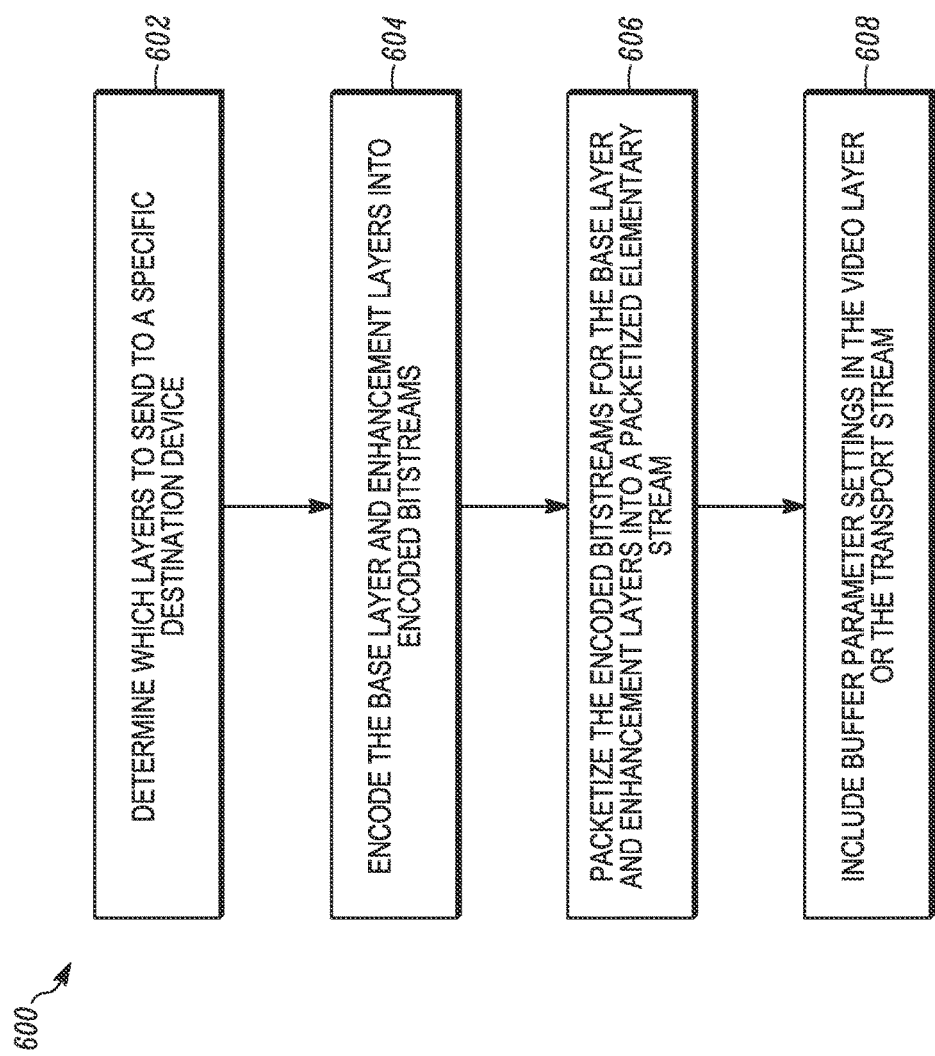
FIG. 6 depicts a simplified flowchart for encoding a scalable video stream according to one embodiment.

The following describes the encoding and decoding processes. FIG. 6 depicts a simplified flowchart 600 for encoding a video stream according to one embodiment. At 602, encoder 106 determines which layers to send to a specific destination device 104. As discussed above, encoder 106 may send base layer 110 and any number of enhancement layers 112 to different destination devices 104.

At 604, encoder 106 encodes base layer 110 and enhancement layers 112 into encoded bitstreams. At 606, encoder 106 packetizes the encoded bitstreams for base layer 110 and enhancement layers 112 into a packetized elementary stream (PES). At 608, encoder 106 includes buffer parameter settings in the video layer or the transport stream. Encoder 106 then transmits the packets including the encoded bitstreams for base layer 110 and enhancement layers 112 to destination device 104.

Figure 7:
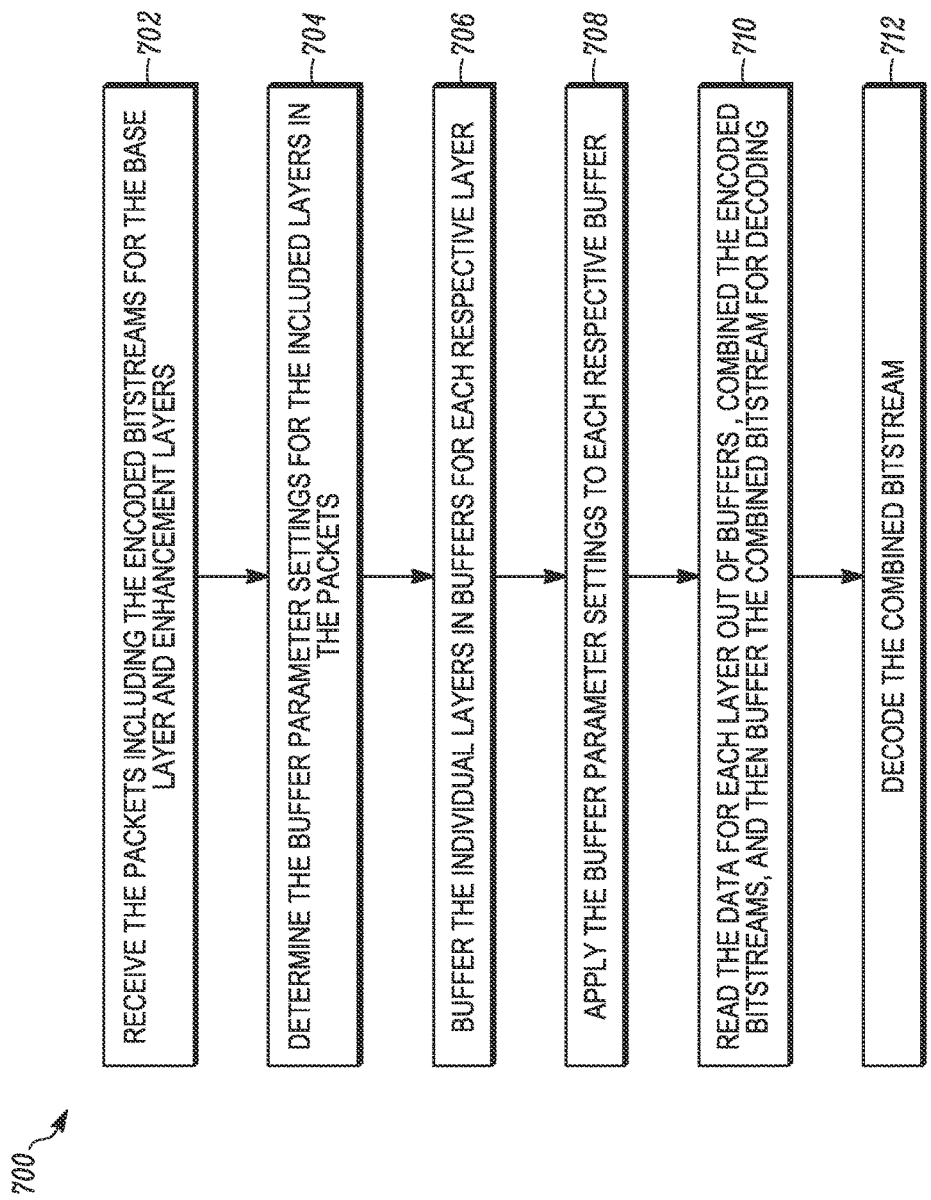
FIG. 7 depicts a simplified flowchart of a method for decoding a scalable video stream according to one embodiment.

FIG. 7 depicts a simplified flowchart 700 of a method for decoding a video stream according to one embodiment. At 702, decoder 108 receives the packets including the encoded bitstreams for base layer 110 and enhancement layers 112. At 704, decoder 108 determines the buffer parameter settings for the included layers in the packets. For example, the buffer parameter settings may be determined from the video layer or the transport stream when the individual buffer parameter settings are enabled.

At 706, decoder 108 buffers the individual layers in buffers 202 for each respective layer. At 708, decoder buffer manager 116 applies the buffer parameter settings to each respective buffer 202. At 710, decoder 108 reads the data for each layer out of buffers 202, combines the encoded bitstreams, and then buffers the combined bitstream for decoding. At 712, decoder 108 then decodes the combined bitstream.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

We claim:

1. A method of decoding a transport stream including a high efficiency video coding (HEVC) layered stream having a plurality of HEVC temporal layers included in one or more elementary streams, the method comprising:
   receiving an HEVC video descriptor including one or more syntax elements in the HEVC video descriptor that apply to the whole HEVC layered stream;
   determining from the HEVC video descriptor one or more elements that indicate whether the plurality of HEVC temporal layers are present in one or more spatial layers in the HEVC layered stream;
   receiving at least one extension descriptor that extends the HEVC video descriptor for each of the plurality of HEVC temporal layers present in the HEVC layered stream;
   determining from the at least one extension descriptor that individual layer parameters for each of the plurality of HEVC temporal layers in the HEVC layered stream are present; and
   decoding each layer of the HEVC layered stream according to individual layer parameters signaled, wherein buffering for a decoding process includes:
      determining buffer parameter settings for buffering each of the plurality of HEVC temporal layers in the transport stream, wherein each of the plurality of HEVC temporal layers includes a respective buffer parameter setting;
      providing respective HEVC temporal layers to individual transport stream buffers for buffering each of the respective HEVC temporal layers in the one or more spatial layers in the HEVC layered stream;
      buffering the plurality of HEVC temporal layers in the individual transport stream buffers according to the respective buffer parameter settings.

2. The method of claim 1, wherein the transport stream comprises HEVC, scalable HEVC (SHVC), multiview HEVC (MV HEVC), or combinations thereof.

3. The method of claim 1, wherein at least one of the buffer parameter settings specifies a bitrate for a respective HEVC temporal layer entering the individual transport stream buffer.

4. The method of claim 1, wherein transport stream buffer parameter settings each specify a buffer size for an individual transport stream buffer.

5. The method of claim 1, further comprising:
buffering one or more HEVC temporal layers in the plurality of HEVC temporal layers present in a single spatial layer in an elementary stream buffer before combining multiple spatial layers for decoding a reassembled bitstream.

6. The method of claim 1, wherein the transport stream buffer parameter settings indicate that individual parameter settings are included in a video layer and/or transport stream.

7. The method of claim 1, wherein the transport stream buffer parameter settings are derived from the respective video stream buffer parameter settings.

8. The method of claim 7, wherein a supplemental enhancement information field includes the video stream buffer parameter settings.

9. The method of claim 8, wherein the video stream buffer parameter settings are linked to the respective transport stream buffer parameter settings.

10. The method of claim 1, wherein the buffer parameter settings are received from an encoder and are encoded in the transport stream that includes the plurality of HEVC temporal layers.

11. The method of claim 10, wherein the buffer parameter settings received from the encoder are included in a video descriptor including the plurality of HEVC layers.

12. The method of claim 1, wherein determining the buffer parameter settings comprises:
pre-setting the transport stream buffer parameter settings in a decoder.

13. An apparatus comprising:
one or more computer processors; and
a computer readable storage medium comprising instructions that, when executed, cause the one or more computer processors to:
receive a high efficiency video coding (HEVC) video descriptor including one or more syntax elements in the HEVC video descriptor that apply to the whole HEVC layered stream;
determine from the HEVC video descriptor one or more elements that indicate whether a plurality of HEVC temporal layers are present in one or more spatial layers in the HEVC layered stream;
receive at least one extension descriptor that extends the HEVC video descriptor for each of the plurality of HEVC temporal layers present in the HEVC layered stream;
determine from the at least one extension descriptor that individual layer parameters for each of the plurality of HEVC temporal layers in the HEVC layered stream are present; and
decode each layer of the HEVC layered stream according to individual layer parameters signaled, wherein buffering for a decoding process includes:
determining buffer parameter settings for buffering each of the plurality of HEVC temporal layers in the transport stream, wherein each of the plurality of HEVC temporal layers includes a respective buffer parameter setting;
sending respective buffer parameter settings to individual transport stream buffers for buffering each of the respective HEVC temporal layers in the one or more spatial layers in the HEVC layered stream.

14. The apparatus of claim 13, wherein sending comprises sending the buffer parameter settings in a transport steam layer including the plurality of HEVC layers.

15. The apparatus of claim 13, wherein at least one of the buffer parameter settings specifies a bitrate for a respective HEVC temporal layer entering the individual transport stream buffer.

16. The apparatus of claim 13, wherein at least one of the buffer parameter settings specifies a buffer size for an individual transport stream buffer.

17. An apparatus comprising:
one or more computer processors; and
a computer readable storage medium comprising instructions that, when executed, cause the one or more computer processors to:
receive a high efficiency video coding (HEVC) video descriptor including one or more syntax elements in the HEVC video descriptor that apply to the whole HEVC layered stream;
determine from the HEVC video descriptor one or more elements that indicate whether a plurality of HEVC temporal layers are present in one or more spatial layers in the HEVC layered stream;
receive at least one extension descriptor that extends the HEVC video descriptor for each of the plurality of HEVC temporal layers present in the HEVC layered stream;
determine from the at least one extension descriptor that individual layer parameters for each of the plurality of HEVC temporal layers in the HEVC layered stream are present;
decode each layer of the HEVC layered stream according to individual layer parameters signaled, wherein buffering for a decoding process includes:
determining buffer parameter settings for buffering each of the plurality of HEVC temporal layers in the transport stream, wherein each of the plurality of HEVC temporal layers includes a respective buffer parameter setting;
applying respective buffer parameter settings to individual buffers for respective HEVC temporal layers in the one or more spatial layers in the HEVC layered stream.

18. The apparatus of claim 17, wherein the buffer parameter settings are received from an encoder and are encoded in the transport stream that includes the plurality of HEVC temporal layers.

19. The apparatus of claim 18, wherein the buffer parameter settings received from the encoder are included in a video descriptor including the plurality of HEVC temporal layers.

20. The apparatus of claim 17, wherein the buffer parameter settings are transport stream buffer parameters linked to respective video stream buffer parameter settings.

* * * * *